(12) United States Patent
Yamada et al.

(10) Patent No.: US 11,026,184 B2
(45) Date of Patent: Jun. 1, 2021

(54) TERMINAL APPARATUS, BASE STATION APPARATUS, AND COMMUNICATION METHOD FOR TRANSMITTING RESOURCE INFORMATION AND TRANSMISSION POWER CONTROL INFORMATION TO THE TERMINAL DEVICE WITH A GRANT-FREE ACCESS RESOURCE ALLOCATION OR A SCHEDULED ACCESS RESOURCE ALLOCATION

(71) Applicants: SHARP KABUSHIKI KAISHA, Sakai (JP); FG INNOVATION COMPANY LIMITED, Tuen Mun (HK)

(72) Inventors: Ryota Yamada, Sakai (JP); Jungo Goto, Sakai (JP); Osamu Nakamura, Sakai (JP); Takashi Yoshimoto, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/099,661

(22) PCT Filed: Apr. 28, 2017

(86) PCT No.: PCT/JP2017/016916
§ 371 (c)(1),
(2) Date: Nov. 7, 2018

(87) PCT Pub. No.: WO2017/195655
PCT Pub. Date: Nov. 16, 2017

(65) Prior Publication Data
US 2019/0159139 A1    May 23, 2019

(30) Foreign Application Priority Data
May 12, 2016  (JP) .............................. JP2016-096130

(51) Int. Cl.
*H04W 52/18* (2009.01)
*H04W 74/00* (2009.01)
(Continued)

(52) U.S. Cl.
CPC ......... *H04W 52/18* (2013.01); *H04W 52/146* (2013.01); *H04W 52/367* (2013.01);
(Continued)

(58) Field of Classification Search
CPC ............. H04W 72/1268; H04W 72/14; H04W 72/042; H04W 74/04; H04W 74/0833;
(Continued)

(56) References Cited

U.S. PATENT DOCUMENTS

2010/0157895 A1\* 6/2010 Pani .................... H04W 52/346 370/328
2012/0177089 A1\* 7/2012 Pelletier ................ H04W 72/14 375/219
(Continued)

FOREIGN PATENT DOCUMENTS

JP  2012-507961 A  3/2012
JP  2013-179417 A  9/2013
WO  2010/051520 A1  5/2010

OTHER PUBLICATIONS

NTT DOCOMO, "New SID Proposal: Study on New Radio Access Technology", RP-160671, 3GPP TSG RAN Meeting #71, Mar. 2016.

*Primary Examiner* — Golam Sorowar
(74) *Attorney, Agent, or Firm* — ScienBiziP, P.C.

(57) ABSTRACT

To improve throughput in a communication environment in which a large number of terminal apparatuses access, a receiver receives information indicating whether a radio resource allocated by a base station apparatus is a grant free access resource or a scheduled access resource, as well as (Continued)

transmission power control information in the scheduled access resource and transmission power control information in the grant free access resource; and a transmitter configured to transmit a transmission signal to the base station apparatus. In a case of communicating by using the scheduled access resource, a transmission power control is performed based on the first transmission power control information to transmit the transmission signal. In a case of communicating by using the grant-free access resource, the transmission power control is performed based on the second transmission power control information to transmit the transmission signal.

9 Claims, 8 Drawing Sheets

(51) Int. Cl.
*H04W 52/14* (2009.01)
*H04W 52/36* (2009.01)
*H04W 72/12* (2009.01)
*H04W 74/02* (2009.01)
*H04W 72/04* (2009.01)

(52) U.S. Cl.
CPC ......... *H04W 72/12* (2013.01); *H04W 74/006* (2013.01); *H04W 72/0446* (2013.01); *H04W 74/02* (2013.01)

(58) Field of Classification Search
CPC . H04W 52/10; H04W 72/04; H04W 72/0413; H04W 72/1215; H04W 74/004; H04W 88/02; H04W 16/04; H04W 16/14; H04W 24/08; H04W 28/0289; H04W 28/16; H04W 40/005; H04W 48/12; H04W 4/08; H04L 1/0003; H04L 5/0044; H04L 1/0009; H04L 1/0016; H04L 1/1887; H04L 5/0053; H04L 1/0001; H04L 1/0018; H04L 1/0023; H04L 1/0025; H04L 1/0029; H04L 1/1812; H04L 1/1825; H04L 1/1896; H04L 27/2607; H04L 27/2646; H04L 43/16; H04L 5/0032; H04L 5/0042
See application file for complete search history.

(56) References Cited

U.S. PATENT DOCUMENTS

| | | | | |
|---|---|---|---|---|
| 2014/0293900 | A1* | 10/2014 | Takeda | H04L 1/0003 370/329 |
| 2017/0127435 | A1* | 5/2017 | Rong | H04L 1/0016 |
| 2017/0164349 | A1* | 6/2017 | Zhu | H04W 28/0247 |
| 2017/0244535 | A1* | 8/2017 | Islam | H04L 5/0028 |
| 2017/0289918 | A1* | 10/2017 | Sun | H04W 52/143 |
| 2017/0310419 | A1* | 10/2017 | Bayesteh | H04L 1/0001 |
| 2017/0318584 | A1* | 11/2017 | Zeng | H04W 72/0413 |
| 2017/0318598 | A1* | 11/2017 | Islam | H04W 74/08 |
| 2017/0367105 | A1* | 12/2017 | Kim | H04W 52/247 |

* cited by examiner

TERMINAL APPARATUS, BASE STATION APPARATUS, AND COMMUNICATION METHOD FOR TRANSMITTING RESOURCE INFORMATION AND TRANSMISSION POWER CONTROL INFORMATION TO THE TERMINAL DEVICE WITH A GRANT-FREE ACCESS RESOURCE ALLOCATION OR A SCHEDULED ACCESS RESOURCE ALLOCATION

TECHNICAL FIELD

The present invention relates to a terminal apparatus, a base station apparatus, and a communication method.

BACKGROUND ART

In recent years, next generation mobile communication systems have been studied. In the next generation mobile communication system, wireless technologies that meet various demands are studied for mainly three use cases. The three use cases are enhanced Mobile Broad Band (eMBB) for extending mobile broadband, massive Machine Type Communication (mMTC) for which accesses by a large number of terminal apparatuses are required, and Ultra-Reliable and Low Latency Communication (URLLC) for which a low latency and high reliability communication is required.

It is conceivable that, particularly in a case of mMTC for which accesses, by a large number of terminal apparatuses are required, LTE (Long Term Evolution), which is the conventional mobile communication system, is insufficient and new access technology is needed. For example, it is conceivable that non-orthogonal multiple access that allows interference to occur between terminal apparatuses may be used with the assumption that the interference signals are removed or suppressed at the receiving side. The non-orthogonal multiple access enables larger capacity transmission compared with orthogonal multi access that does not assume interference between terminal apparatuses. Description of the above points are made in NPL 1.

CITATION LIST

Non-Patent Literature

NPL 1: NTT Docomo, "Study on NR New Radio Access Technology," 3GPP TSG RAN Meeting #71, March 2016.

SUMMARY OF INVENTION

Technical Problem

Although the non-orthogonal access allows the interference signal to be removed or suppressed at the receiving side, there is an issue, in a case that the interference is too large, removal or suppression of the interference cannot be performed, thus degrading the throughput.

The present invention has been made in view of such circumstances, and an object of the present invention is to provide a base station apparatus, a terminal apparatus, and a communication method capable of improving throughput in a communication environment in which accesses are performed by a large number of terminal apparatuses.

Solution to Problem

To address the above-mentioned issue, a base station apparatus, a terminal apparatus, and a communication method according, to an aspect of the present invention are configured as follows.

A terminal apparatus according to an aspect of the present invention is a terminal apparatus for communicating with a base station apparatus, the terminal apparatus including a receiver configured to receive information for indicating whether a radio resource allocated by a base station apparatus is a grant-free access resource or a scheduled access resource, as well as transmission power control information in the scheduled access resource (first transmission power control information) and transmission power control information in the grant-free access resource (second transmission power control information); and a transmitter configured to transmit a transmission signal to the base station apparatus, wherein in a case of communicating by using the scheduled access resource, a transmission power control is performed based on the first transmission power control information to transmit the transmission signal, and in a case of communicating by using the grant-free access resource, the transmission power control is performed based on the second transmission power control information to transmit the transmission signal.

Further, in the terminal apparatus according to one aspect of the present invention, the first transmission power control information includes a transmission power value or a transmission power control parameter, and in a case that the transmission power value is included, a transmission is performed at the transmission power, and in a case that the transmission power control parameter is included, the transmission is performed at a transmission power calculated based on the transmission power control parameter.

Further, in the terminal apparatus according to one aspect of the present invention, in a case of communicating by using the grant-free access resource, a transmission is performed at a transmission power obtained by adding a random power offset to a power calculated based on a transmission control parameter included in the second transmission power control information.

In a case of communicating by using the grant-free access resource, a power headroom is calculated that is a difference between a maximum transmission power and a transmission power calculated based on a transmission power control parameter included in the second transmission power control information, and in a case that the power headroom has a negative value, the terminal apparatus requests a scheduled access to the base station apparatus.

Also, a base station apparatus according to an aspect of the present invention is a base station apparatus for communicating with a terminal apparatus, the apparatus including a transmitter configured to transmit information for indicating whether a radio resource allocated to the terminal device is a grant-free access resource or a scheduled access resource, as well as transmission power control information in the scheduled access resource (first transmission power control information) and transmission power information in the grant-free access resource (second transmission power information); and a receiver configured to receive a signal from the terminal apparatus, wherein in a case that the information for indicating either of the grant-free access resource or the scheduled access resource indicates the scheduled access resource, the signal subjected to a transmission power control based on the first transmission power control information is received, and in a case that the information for indicating either of the grant-free access resource or the scheduled access resource indicates the grant-free access resource, the signal subjected to the transmission power control based on the second transmission power control information is received.

Further, in the terminal apparatus according to one aspect of the present invention, the first transmission power control information includes a transmission power value or a transmission power control parameter, and in a case that the transmission power value is included, the signal transmitted at the transmission power is received, and in a case that the transmission power control parameter is included, the signal transmitted at a transmission power calculated based on the transmission power control parameter is received.

Further in the terminal apparatus according, to one aspect of the present invention, in a case that the information for indicating either of the grant-free access resource or the scheduled access resource indicates the grant-free access resource, the base station apparatus receives the signal transmitted at a transmission power obtained by adding a random power offset to a power calculated based on a transmission control parameter included in the second transmission power control information.

A communication method according to an aspect of the present invention is a communication method of a terminal apparatus for communicating with a base station apparatus, the method including steps of receiving information for indicating whether a radio resource allocated by a base station apparatus is a grant-free access resource or a scheduled access resource, as well as transmission power control information in the scheduled access resource (first transmission power control information) and transmission power control information in the grant-free access resource (second transmission power control information), and transmitting a transmission signal to the base station apparatus, wherein in a case of communicating by using, the scheduled access resource, the terminal apparatus a transmission power control is performed based on the first transmission power control information to transmit the transmission signal, and in a case of communicating by using the grant-free access resource, the transmission power control is performed based on the second transmission power control information to transmit the transmission signal.

Also, a communication method according to one aspect of the present invention, is a communication method of a base station apparatus for communicating with a terminal apparatus, the method including steps of transmitting information for indicating whether a radio resource allocated to the terminal device is a grant-free access resource or a scheduled access resource, as well as transmission power control information in the scheduled access resource (first transmission power control information) and transmission power control information in the grant-free access resource (second transmission power control information), and receiving a signal from the terminal apparatus, wherein in a case that the information for indicating either of the grant-free access resource or the scheduled access resource indicates the scheduled access resource, the signal subjected to a transmission power control based on the first transmission power control information is received, and in a case that the information for indicating either of the grant-free access resource or the scheduled access resource indicates the grant-free access resource, the signal subjected to the transmission power control based on the second transmission power control information is received.

Advantageous Effects of Invention

The present invention enables throughput to be improved.

DESCRIPTION OF EMBODIMENTS

A communication system according to the present embodiment includes a base station apparatus (a transmission apparatus, a cell, a transmission point, a group of transmit antennas, a group of transmit antenna ports, a component carrier, and eNodeB) and a terminal apparatus (a terminal, a mobile terminal, a reception point, a reception terminal, a reception apparatus, a group of receive antennas, a group of receive antenna ports, and LIE). Also, a base station apparatus connected to a terminal apparatus (establishing a wireless link) is referred to as a serving cell.

The base station apparatus and the terminal apparatus according to the present embodiment are allowed to communicate in a frequency band called a licensed band for which a wireless carrier has obtained an approval for usage (license) from a country or region for which the wireless carrier provides a service, and/or in a frequency band called an unlicensed band for which no approval for usage (license) from a country or region is required.

According to the present embodiment, "X/Y" includes the meaning of "X or Y". According to the present embodiment, "X/Y" includes the meaning of "X and Y". According to the present embodiment, "X/Y" includes the meaning of "and/or Y".

Figure 1:
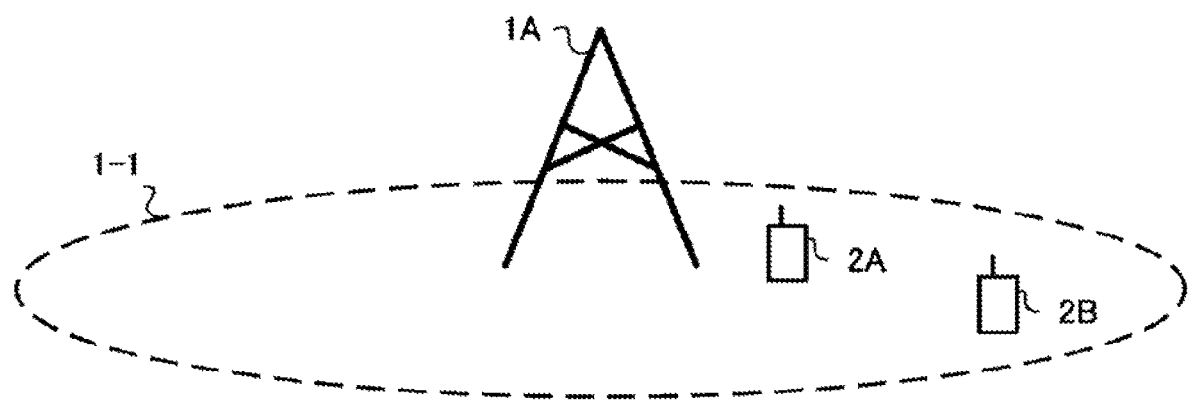
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and terminal apparatuses 2A and 2B. Coverage 1-1 is a range (a communication area) in which the base station apparatus 1A is able to connect to the terminal apparatuses. The terminal apparatuses 2A and 2B are also collectively referred to as terminal apparatuses 2.

With respect to FIG. 1, the following uplink physical channels are used for uplink radio communication from the terminal apparatus 2A to the base station apparatus 1A. The uplink physical channels are used for transmitting information output from higher layers.

Physical uplink control channel (PUCCH)
Physical uplink shared channel (PUSCH)
Physical random access channel (TRACH)

The PUCCH is used for transmitting Uplink Control information (UCI). The Uplink. Control information includes a positive ACKnowledgement (ACK) or a Negative ACKnowledgement (NaCK) (ACK/NACK) for downlink data (a downlink transport block or a Downlink-Shared CHannel (DL-SCH)). The ACK/NACK for the downlink data is also referred to as HARQ-ACK or HARQ feedback.

In addition, the Uplink Control Information includes Channel State Information (CSI) for the downlink. In addition, the Uplink Control Information includes a Scheduling Request (SR) used to request an Uplink-Shared CHannel (UL-SCH) resource. The Channel State Information refers to a Rank Indicator (RI) specifying a suited spatial multiplexing number, a Precoding Matrix Indicator (PMI) specifying a suited precoder, at Channel Quality Indicator (CQI) specifying a suited transmission rate, a CSI-Reference Signal (CSI-RS) Resource Indication (CRI) indicating a suited CSI-RS resource, and the like.

The Channel Quality Indicator (hereinafter, referred to as a CQI value) can be a suited modulation scheme (e.g. QPSK, 16 QAM, 64 QAM, 256 QAM, or the like) and a suited coding rate in a predetermined band (details to be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank Indicator, the Precoding Matrix Indicator, and the Channel Quality Indicator are collectively referred to as CSI values.

The PUSCH is used for transmitting uplink data (an uplink transport block, UL-SCH). Furthermore, the PUSCH may be used for transmitting the ACK/NACK and/or the Channel State Information along with the uplink data. In addition, The PUSCH may be used to transmit the Uplink Control Information only.

The PUSCH is used to transmit an RRC message. The RRC message is a signal/information that is processed in a Radio Resource Control (RRC) layer. Further, the PUSCH is used to transmit an MAC Control Element (CE). Here, MAC CE is a signal information that is processed (transmitted) in a Medium Access Control (MAC) layer.

For example, a power headroom may be included in the MAC CE and may be reported via the PUSCH. Namely, a MAC CE field may be used to indicate a level of the power headroom.

The PRACH is used to transmit a random access preamble.

In the uplink radio communication, an UpLink Reference Signal (UL RS) is used as an uplink physical signal. The uplink physical signal is not used for transmitting information output from higher layers, but is used by a physical layer. The Uplink Reference Signal includes a DeModulation Reference Signal (DMRS) and a Sounding Reference Signal (SRS).

The DMRS is associated with transmission of the PUSCH or the PUCCH. For example, the base station apparatus 1A uses the DMRS in order to perform channel compensation of the PUSCH or the PUCCH. The SRS is not associated with the transmission of the PUSCH or the PUCCH. For example, the base station apparatus 1A uses the SRS to measure an uplink channel state.

In FIG. 1, the following downlink physical channels are used for the downlink radio communication from the base station apparatus 1A to the terminal apparatus 2A. The downlink physical channels are used for transmitting information output from higher layers.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

The PBCH is used for broadcasting a Master Information Block (MIB, a Broadcast CHannel (BCH)) that is shared by the terminal apparatuses. The PCFICH is used for transmitting information indicating a region (e.g. the number of OFDM symbols) to be used for transmitting the PDCCH.

The PHICH is used for transmitting the ACK/NACK with respect to the uplink data (a transport block, a codeword) received by the base station apparatus 1A. Namely, the PHICH is used for transmitting a HARQ indicator (HARQ feedback) indicating the ACK/NACK with respect to the uplink data. Note that ACK/NACK is also referred to as the HARQ-ACK. The terminal apparatus 2A reports the ACK/NACK that has been received to a higher layer. The ACK/NACK refers to the ACK indicating a successful reception, the NACK indicating an unsuccessful reception, and DTX indicating that no corresponding data is present. In a case that the PHICH for the uplink data is not present, the terminal apparatus 2A reports the ACK to the higher layer.

The PDCCH and the EPDCCH are used to transmit Downlink Control Information (DCI). Here, multiple DCI formats are defined for transmitting the Downlink Control Information. Namely, a field for the Downlink Control Information is defined in a DCI format and is mapped to information bits.

For example, as a DCI format for the downlink, DCI format 1A to be used for the scheduling of one PDSCIH in one cell (transmission of a single downlink transport block) is defined.

For example, the DCI format for the downlink includes the Downlink Control Information such as information related to PDSCH resource allocation, information related to a Modulation and Coding Scheme (MCS) for the PDSCH, and a TPC command for the PUCCH. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes Uplink Control Information such as information related to PUSCH resource allocation, information related to the MCS for the PUSCH, and the TPC command for the PUSCH. The DCI format for the uplink is also referred to as uplink grant (or uplink assignment).

Further, the DCI format for the uplink can be used to make a request (CSI request) for the Channel State information (CSI, which is also referred to as reception quality information) on the downlink.

The DCI format for the uplink can be used for a configuration for indicating an uplink resource to which a CSI feedback report is mapped, the CSI feedback report being fed back by the terminal apparatus to the base station apparatus. For example, the CSI feedback report can be used for a configuration for indicating an uplink resource for periodically reporting Channel State Information (periodic CSI). The CSI feedback report can be used for a mode configuration (CSI report mode) for periodically reporting the Channel State Information.

For example, the CSI feedback report can be used for a configuration for indicating an uplink resource to report aperiodic Channel State Information (aperiodic CSI). The CSI feedback report can be used for a mode configuration for aperiodically reporting the Channel State Information (CSI report mode). The base station apparatus may configure any one of the periodic CSI feedback report and the aperiodic CSI feedback report. In addition, the base station apparatus may configure both the periodic CSI feedback report and the aperiodic CSI feedback report.

The DCI format for the uplink can be used for a configuration for indicating a type of the CSI feedback report that is fed back by the terminal apparatus to the base station apparatus. Examples of the type of CSI feedback report include wideband CSI (e.g. Wideband CQI), and narrowband CSI (e.g. Subband CCI).

In a case that a PDSCH resource is scheduled in accordance with the downlink assignment, the terminal apparatus receives the downlink data on the scheduled PDSCH. In a case that a PUSCH resource is scheduled in accordance with the uplink grant, the terminal apparatus transmits the uplink data and/or the Uplink Control Information on the scheduled PUSCH.

The PDSCH is used for transmitting the downlink data (the downlink transport block, DL-SCH). The PDSCH is used for transmitting a system information block type 1 message. The system information block type 1 message is cell-specific information.

The PDSCH is used to transmit a system information message. The system information message includes a system information block X other than the system information block type 1. The system information message is cell-specific information.

The PDSCH is used for transmitting, the RRC message. Here, the RRC message transmitted from the base station apparatus may be shared by multiple terminal apparatuses in a cell. Further, the RRC message transmitted from the base station apparatus 1A may be a dedicated message (also referred to as dedicated signaling) to a given terminal apparatus 2. Namely, user equipment specific (unique to user equipment) information is transmitted using a message dedicated to the given terminal apparatus. The PDSCH is used for transmitting the MAC CE.

Here, the RRC message andfor CE is also referred to as higher layer signaling.

The PDSCH can be used to request the downlink Channel State Information. The PDSCH can be used for transmitting an uplink resource to which the CSI feedback report is mapped, the CSI feedback report being fed back by the terminal apparatus to the base station apparatus. For example, the CSI feedback report can be used for a configuration for indicating an uplink resource to periodically report the Channel State Information (periodic CSI). The CSI feedback report can be used to for a mode configuration (CSI report mode) for periodically reporting the Channel State Information (CSI report mode).

Examples of the type of downlink CSI feedback report include the wideband CSI (e.g. Wideband CSI) and the narrowband CSI (e.g. Subband CSI). The wideband CSI calculates one piece of the Channel State Information for the system band of a cell. The narrowband CSI divides the system band in predetermined units and calculates one piece of the Channel State Information for each division.

In the downlink radio communication, a Synchronization signal (SS) and a Downlink Reference Signal (DL RS) are used as downlink physical signals. The downlink physical signals are not used for transmitting, information output from the higher layers, but are used by the physical layer.

The synchronization signal is used for the terminal apparatus to take synchronization in the frequency domain and the time domain in the downlink. The Downlink Reference Signal is used for the terminal apparatus to perform channel compensation of a downlink physical channel. For example, the Downlink Reference Signal is used for the terminal apparatus to calculate the downlink Channel State Information.

Here, the Downlink Reference Signals include a Cell-specific Reference Signal (CRS), a UE Specific Reference Signal or a terminal apparatus-specific reference signal (URS) related to the PDSCH, the DeModulation Reference Signal (DMRS) related to the EPDCCH, a Non-Zero Power Chanel State Information-Reference Signal (NZP CSI-RS), and a Zero Power Chanel State Information-Reference Signal (ZP CSI-RS).

The CRS is transmitted in an entire band of a subframe and is used to perform the demodulation of the PBCH/PDCCH/PHICH/PCFICH/PDSCH. The URS related to the PDSCH is transmitted in a subframe and a band that are used for transmitting the PDSCH to which the URS is related, and is used to demodulate the PDSCH to which The URS is related.

The DMRS related to the EPDCCH is transmitted in a subframe and a band that are used for transmitting the EPDCCH to which the DMRS is related. The DMRS is used to demodulate the EPDCCH to which the DMRS is related.

A resource for the NZP CSI-RS is configured by the base station apparatus 1A. For example, the terminal apparatus 2A performs signal measurement (channel measurement) using the NZP CSI-RS. A resource for the ZP CSI-RS is configured by the base station apparatus 1A. With zero output, the base station apparatus 1A transmits the ZP CSI-RS. The terminal apparatus 2A performs interference measurement in a resource to which the NZP CSI-RS corresponds, for example.

A Multimedia Broadcast multicast service Single Frequency Network (MBSFN) RS is transmitted in all bands of the subframe used for transmitting a PMCH. The MBSFN RS is used to demodulate the PMCH. The PMCH is transmitted via the antenna port used for transmitting the MBSFN RS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

Further, the BCH, the UL-SCH, and the DL-SCH are transport channels. The channel used in the Medium Access Control (MAC) layer is referred to as a transport channel. A unit of the transport channel used in the MAC layer is also referred to as a Transport Block (TB) or a MAC Protocol Data Unit (PDU). The Transport Block is a unit of data that the MAC layer delivers to the physical layer. In the physical layer, the Transport Block is mapped to a codeword, and coding processing or the like is performed for each codeword.

Also, the base station apparatus can communicate, by integrating a plurality of component carriers (CC) for a transmission with a wider bandwidth, with a terminal apparatus that supports carrier aggregation (CA). In the carrier aggregation, one primary cell (PCell) and one or more secondary cells (SCell) are configured as an aggregation of serving cells.

In dual connectivity (DC), a master cell group (MCG) and a secondary cell group (SCG) are configured as a group of serving cells. The MCG is constituted of a PCell and optionally one or more SCells. In addition, the SCG is constituted of a primary SCell (PSCell) and optionally one or more SCells.

Further, in a case that a PUSCH resource is scheduled in accordance with the uplink grant, the terminal apparatus can communicate with the base station apparatus by a scheduled access that transmits the uplink data on the scheduled (allocated) PUSCH. Further, the terminal apparatus can communicate with the base station apparatus by a grant-free access (contention-based access) that transmits the uplink data without the uplink grant (scheduling). For example, the grant-free access allows a terminal apparatus to perform a communication using a determined resource or a random resource within a resource area configured by the base station apparatus or a pre-configured resource area. The grant-free access enables reduced latency due to a simplified process related to the scheduling and reduced overhead due to less control information.

Note that, even in a case that an interference canceler or the like is applied in a receiving apparatus, the base station apparatus may not cancel interference. In a case that the base station apparatus cannot cancel the interference and detects an error, the base station apparatus can request a retransmission to each terminal apparatus.

Figure 2:
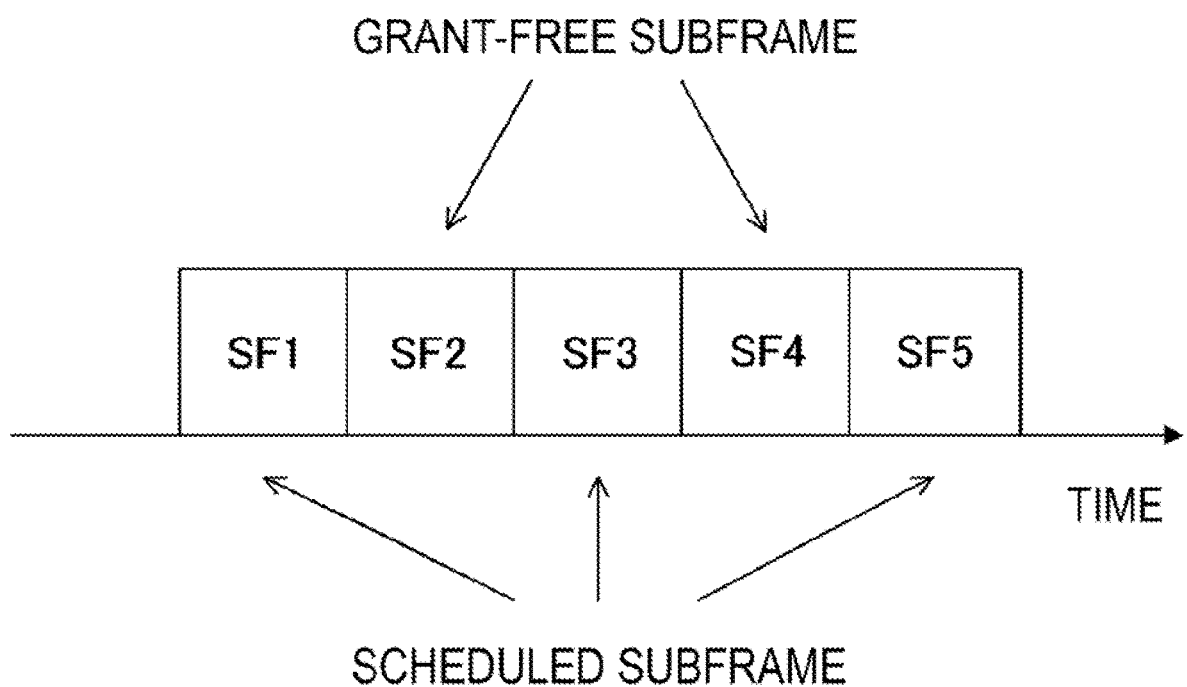
FIG. 2 is a diagram illustrating an example of allocation of grant-free access and scheduled access in the time domain according to the present embodiment.

For example, the base station apparatus can configure a resource (area) that enables the scheduled access and a resource (area) that enables the grant-free access. FIG. 2 illustrates an example in a case that such a resource is configured in a time resource (subframe, symbol). Further, a subframe that enables the scheduled access is also referred to as a scheduled subframe, and a subframe that enables the grant-free access is also referred to as a grant-free subframe. FIG. 2 illustrates an example of five subframes from SF 1 to SF 5, out of which SF 1, SF 3, and SF 5 are scheduled subframes and SF 2 and SF 4 are grant-free subframes. Also, the scheduled subframes and the grant-free subframes may be fixed, or alternatively the base station apparatus may configure or instruct, for the terminal apparatus, which subframe to be used as a scheduled subframe or a grant-free subframe. Further, the configuration or the instruction as to which subframe to be used as a scheduled subframe or a grant-free subframe may be a terminal apparatus-specific configuration by means of, for example, RRC signaling, system information, or the like, or may be a common configuration within the entire cell by means of a broadcast or the like. As a method of broadcasting, for example, the base station apparatus may dynamically provide instructions using the Downlink Control Information. Further, in a case that the Downlink Control Information is scrambled with a predetermined RNTI (Radio Network Temporary Identifier), the terminal apparatus can determine that the Downlink Control Information includes a configuration or an instruction as to which subframe to be used as a scheduled subframe or a grant-free subframe. In addition, in a case that a terminal apparatus is handed over, the base station apparatus can notify which subframe to be used as a grant-free subframe or a scheduled subframe in a cell to which the terminal apparatus is handed over.

Note that, which subframe to be used as a grant-free subframe or a scheduled subframe can be instructed to or configured for the terminal apparatus by the base station apparatus, or requested by the terminal apparatus. In a case of the CA or the DC, there may be a cell that enables the grant-free access and a cell that enables the scheduled access. In such a case, the cell in which the grant-free access is performed and the cell in which the scheduled access is performed are subjected to the CA or the DC.

Figure 3:
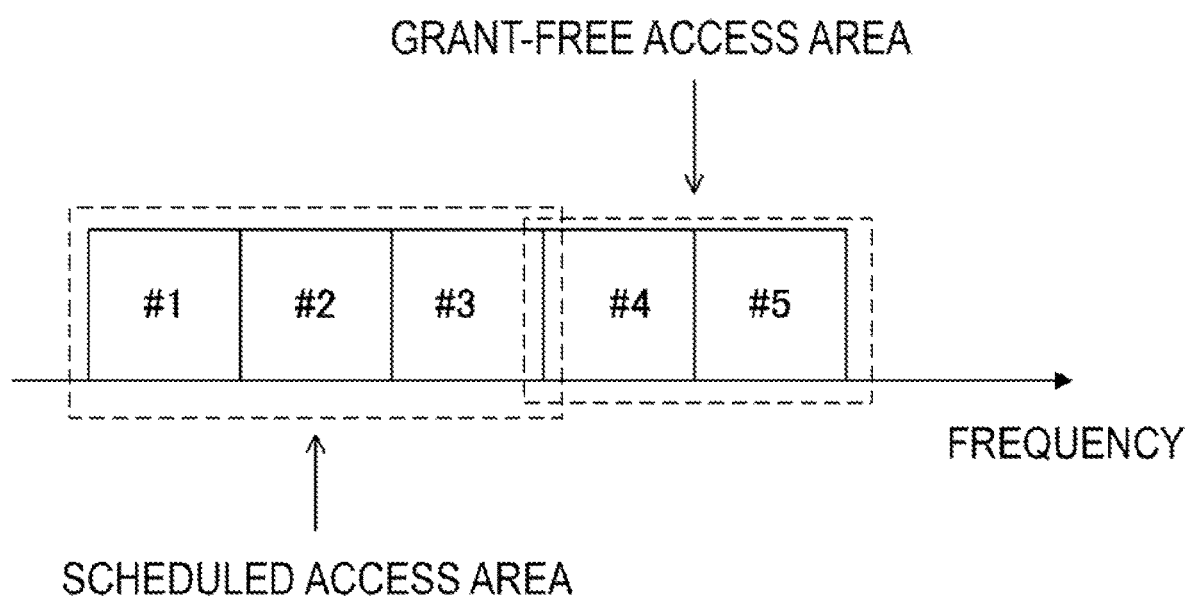
FIG. 3 is a diagram illustrating an example of allocation of grant-free access and scheduled access in the frequency domain according to the present embodiment.

FIG. 3 illustrates an example in which a scheduled access area and a grant-free access area are allocated in the frequency domain. FIG. 3 is an example of division into five blocks, out of which #1 to #3 are the scheduled access areas and #4 and #5 are the grant-free access areas. The scheduled access areas and the grant-free access areas may be fixed. Alternatively, the base station apparatus may configure or instruct, for the terminal apparatus, the scheduled access areas and the grant-free access areas.

Additionally, the base station apparatus can configure the scheduled access area and the grant-free access area in the time domain and in the frequency domain. For example, in a subframe configured as a grant-free subframe in the time domain, a part of frequency resources can be used as the grant-free access area, and the remaining part of frequency resources can be used as the scheduled access area. Similarly to the above, the scheduled subframes and the gram-free subframes may be fixed, or configured by the base station apparatus. Further, the scheduled access areas and the grant-free access areas may be fixed or configured by the base station apparatus. Also, the base station apparatus may have the configuration in the time domain and the configuration in the frequency domain separately.

In addition, with respect to access methods, communication may be performed using an orthogonal multiple access scheme, such as Orthogonal Frequency Division Multiple Access (OFDMA) and Single Carrier-FDMA (SC-FDMA), in which terminal apparatuses are multiplexed on orthogonal resources, or a non-orthogonal multiple access scheme in which terminal apparatuses are multiplexed non-orthogonally. In the non-orthogonal multiple access scheme, for example, the number of terminals that can be allocated is larger than the number of resources to be used. Namely, in the non-orthogonal multiple access scheme, interference occurs in the receiving apparatus, but interference signals can be eliminated or suppressed by providing advanced receiving methods such as maximum likelihood detection and interference canceler. The elimination of the interference allows the non-orthogonal multiple access scheme to increase the number of terminals that can be allocated compared to the orthogonal multiple access scheme, thus improving the frequency utilization efficiency.

In the non-orthogonal access method, it is assumed that a receiving method for eliminating or suppressing an interference signal is provided at the receiving side (e.g. a base station apparatus). At this time, in a case that transmission apparatuses (e.g. terminal apparatuses) perform transmissions with different transmission parameters, the reception quality varies depending on the transmission parameters of each transmission, thus allowing the performance of the interference canceler to be improved. The transmission parameters are, for example, transmission power (energy), the Modulation and Coding Scheme (MCS), a modulation scheme, a coding rate, the number of allocated resources (spreading factor), and a spreading code.

Figure 4:
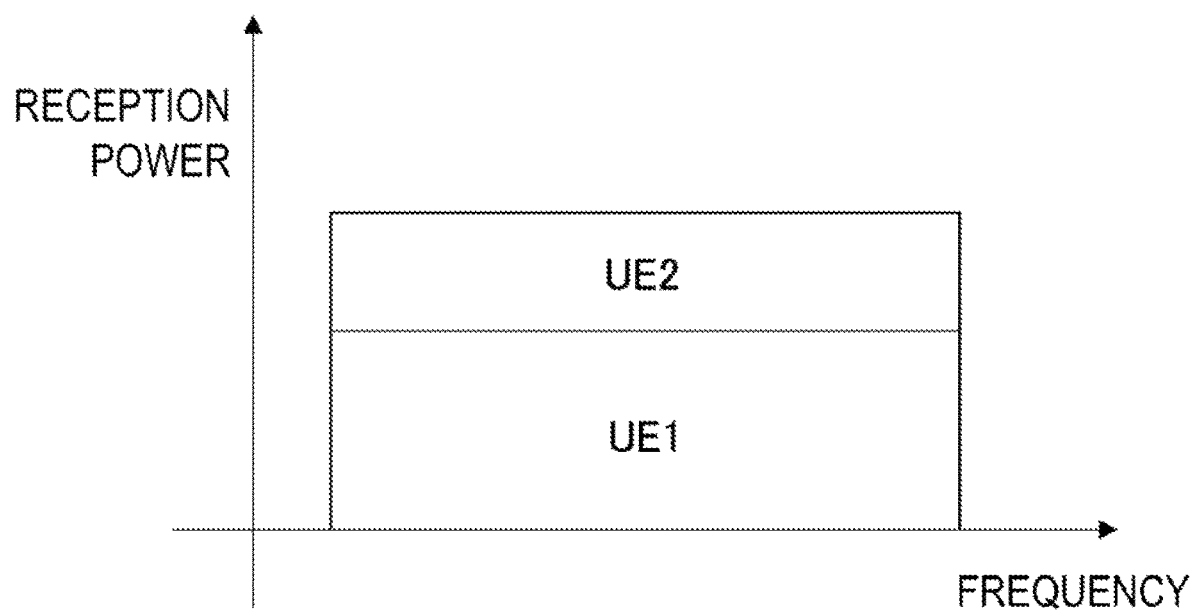
FIG. 4 is a diagram illustrating an example of non-orthogonal multiple access according to the present embodiment.

FIG. 4 illustrates an example in a case that the base station apparatus receives signals, from the terminal apparatuses, each of the signals having different reception power. FIG. 4 illustrates a case in which the reception power from the first terminal apparatus (UE 1 in the figure) is larger than the reception power from the second terminal apparatus (UE 2 in the figure). A control of transmission power may be used to change the transmission power according to a certain condition. The base station apparatus can transmit, to each terminal apparatus, transmission power Control information for controlling transmission power.

In a case of communicating with the scheduled access, since the base station apparatus perform the scheduling for the terminal apparatuses, the non-orthogonal multiple access can be used such that the interference signal can be eliminated or suppressed by the base station apparatus. As an example, a method of receiving signals from the terminal apparatuses will be described, each of the signals having a different reception power by a transmission power control in the case of the scheduled access. For example, the base station apparatus can include, in the transmission power control information, an instruction or configuration to perform a transmission with a fixed transmission power. For example, the first terminal apparatus may be close to the base station apparatus with the reception power being high, and the second terminal apparatus may be far from the base station apparatus with the reception power being low. In such a condition, in a case that the first terminal apparatus performs a transmission with the same transmission power as the second terminal apparatus, the reception power of the first terminal apparatus is different from that of the second terminal apparatus. Note that there may be a plurality of fixed values for the transmission power, in this case, the base station apparatus instructs one of the plurality of fixed values for the transmission power to a terminal apparatus, and the terminal apparatus transmits a signal with the instructed transmission power. In addition, transmission power control information in the scheduled access is also referred to as first transmission power control information.

Also, a transmission power control can be performed for any one of the terminal apparatuses that are multiplexed such that the reception power becomes constant for each of the terminal apparatuses. For example, the first transmission power control information includes a fixed transmission power and/or a transmission power control parameter. In a case that the multiple access is performed by the first terminal apparatus and the second terminal apparatus, the base station apparatus can configure the fixed transmission power in the transmission power control information of the first terminal apparatus, and indicate (configure) the transmission power control parameter in the transmission power control information of the second terminal apparatus. The transmission power control parameters are some or all of the parameters including the number of allocated resource blocks (bandwidths), a target reception power, a path loss compensation value, an offset, and a transmission power control command. Each parameter included in the transmission power control parameters is valuable for each serving cell and for each subframe. Note that the target reception power is the sum of a power value (nominal reception power) that is common within the cell or within the terminal apparatus group, configured by the base station apparatus, and a power value specific to the terminal apparatus. The path loss compensation value can be obtained by calculating the product of the downlink path loss estimated value calculated by the terminal apparatus and the path loss compensation coefficient a which has values from zero to one. Note that u may be selected from candidate values including zero and one. The offset is an offset value configured by the base station apparatus. The transmission power control command is an offset value instructed by the Downlink Control Information. Further, in a case that a transmission power is determined using the transmission power control parameter, the terminal apparatus may determine the transmission power, for example, using the following equation:

$P_{PUSCH} = \min\{P_{CMAX}, 10 \log_{10}(M_{PUSCH}) + P_{O\_PUSCH} + \alpha \cdot PL + \Delta_{TF} + f\}$ where min { } indicates that the minimum value is selected among the values calculated between the symbols and {and}, $P_{CMAX}$ is the maximum allowable transmission power, $M_{PUSCH}$ is the number of allocated resource blocks, $P_{O\_PUSCH}$ is the target reception power, PL is the path loss estimated value, $\Delta_{TF}$ is the offset related to the multiple discrete values of the modulation, and f is the transmission power control command. Whether to perform a transmission power control for a terminal apparatus is instructed or configured by the base station apparatus. Further, each of the transmission power control parameters may be transmitted through the same signaling. Alternatively, some of the parameters may be transmitted through higher layer signaling, and the remaining parameters may be transmitted through physical layer signaling.

In addition, the base station apparatus can control the transmission power of each of the terminal apparatuses such that the reception power is different for each of the terminal apparatuses. For example, in a case that the multiple access is performed by the first terminal apparatus and the second terminal apparatus, the base station apparatus may configure the transmission power control parameters such that the reception power of the first terminal apparatus is different from the reception power of the second terminal apparatus. For example, the base station apparatus configures the path loss compensation coefficient a for each terminal apparatus. For example, α=1.0 is configured for a certain terminal apparatus, and α=0.9 for another terminal apparatus. As a result, the path loss compensation value is different for each terminal apparatus, thus allowing the reception power to be different for each terminal apparatus. The base station apparatus can further configure the offset value $P_{NO}$ for the non-orthogonal multiple access. In this case, the terminal apparatus may determine the transmission power by the following equation:

$P_{PUSCH} = \min\{P_{CMAX}, 10 \log_{10}(M_{PUSCH}) + P_{O\_PUSCH} + \alpha \cdot PL + \Delta_{TF} + f + P_{NO}\}$ in consideration of $P_{NO}$. The offset value $P_{NO}$ or a range/maximum value of $P_{NO}$ for the non-orthogonal multiple access can be instructed by the base station apparatus or can be configured randomly by the terminal apparatus within a predetermined range. $P_{NO}$ or the range/maximum value of $P_{NO}$ may also be included in the transmission power control parameters.

A method of receiving signals from the terminal apparatuses Will be described, each of the signals having a different reception power by the transmission power control in a case of communicating with the grant-free access. In the case of the grant-free access, unlike the scheduled access, for example, the transmission power command instructed by the Downlink Control Information is not included in the transmission power control parameters. In this case, the terminal apparatus determines the transmission power by the following equation:

$P_{PUSCH} = \min\{P_{CMAX}, 10 \log_{10}(M_{PUSCH}) + P_{O\_PUSCH} + \alpha \cdot PL + \Delta_{TF}\}$, without considering the transmission power control command f. Further, the terminal apparatus can transmit a signal with a random power offset. For example, the terminal apparatus can select a random power offset value $P_{rand}$ within a certain range. In this case, the terminal apparatus may determine the transmission power by the following equation:

$P_{PUSCH} = \min\{P_{CMAX}, 10 \log_{10}(M_{PUSCH}) + P_{O\_PUSCH} + \alpha \cdot PL + \Delta_{TF} + P_{rand}\}$. In addition, the result (value) selected by the terminal apparatus is transmitted to the base station apparatus. Alternatively, the terminal apparatus changes the scrambling ID, the initial value of the reference signal sequence, and the like, according to the selected value. In addition, the base station apparatus can transmit the transmission power control information including the transmission power control parameters to the terminal apparatus. Note that, the transmission power control information in the grant-free access is also referred to as the second transmission power control information. Note that, $P_{rand}$ may be the same as $P_{NO}$ described in the schedule access.

Further, the terminal apparatus reports, to the base station apparatus, the power headroom (PH) which is the difference between the maximum transmission power and the transmission power determined based on the transmission power control parameters. The terminal apparatus may calculate the PH by the following equation:

$PH = P_{CMAX} - \{10 \log_{10}(M_{PUSCH}) + P_{O\_PUSCH} + \alpha \cdot PL + \Delta_{TF} + P_{rand}\}$. In a case of reporting the transmission power reserve not including a random element, the terminal apparatus calculates the PH without considering $P_{rand}$, namely with the assumption of $P_{rand} = 0$. Also, the PH may be reported in a case that a resource is not allocated. In such a condition, the terminal apparatus calculates the PH with the assumption of $M_{PUSCH} = 1$ and $P_{rand} = 0$.

Further, the terminal apparatus can change the offset of the transmission power according to the PH. For example, the terminal apparatus increases the transmission power in a case that the PH is equal to or greater than a certain threshold value, and decreases the transmission power in a case that the PH is equal to or less than a certain threshold value. Further, in a case that the PH is a negative value, the terminal apparatus may request, to the base station apparatus, the scheduled access without performing the grant-free access. In this case, the terminal apparatus may determine the transmission power by the following equation:

$P_{PUSCH} = \min\{P_{CMAX}, 10 \log_{10}(M_{PUSCH}) + P_{O\_PUSCH} + \alpha \cdot PL + \Delta_{TF} + P_{PH}\}$, where $P_{PH}$ is a parameter that is variable according to the PH.

Figure 5:
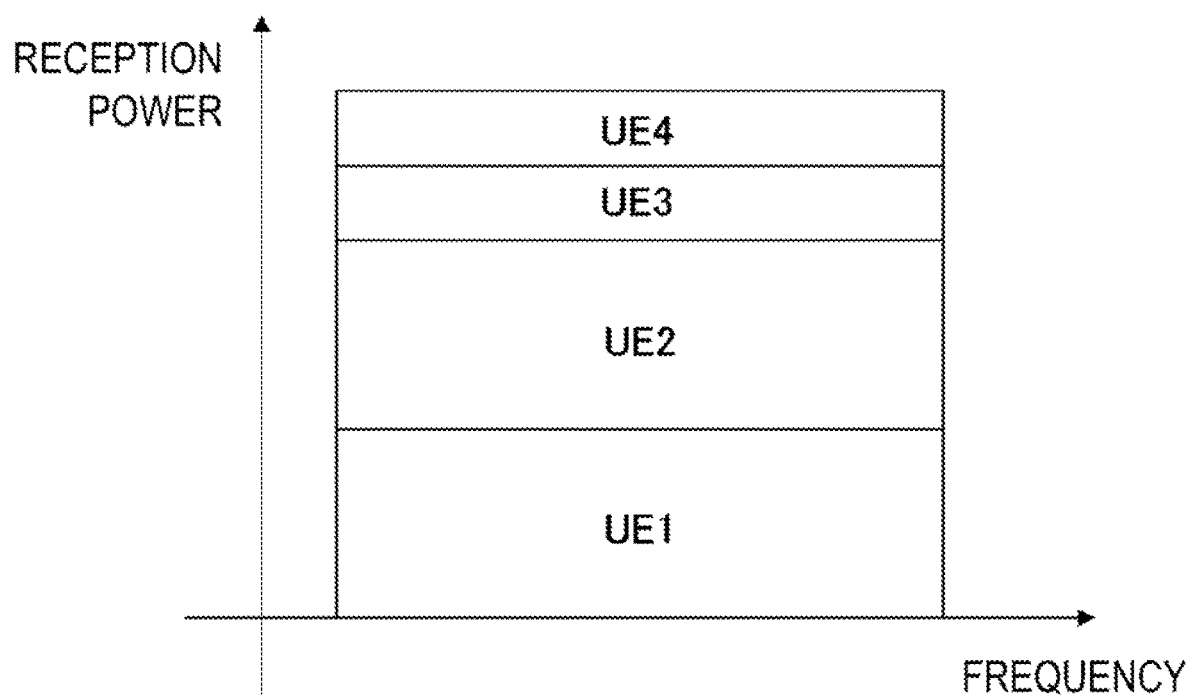
FIG. 5 is a diagram illustrating an example of non-orthogonal multiple access according to the present embodiment.
Figure 6:
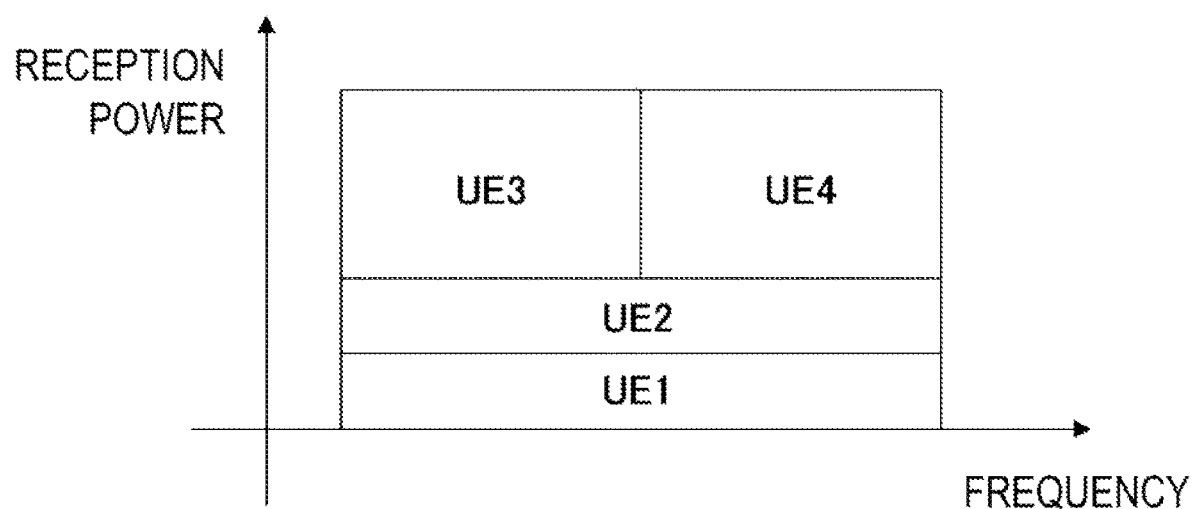
FIG. 6 is a diagram illustrating an example of non-orthogonal multiple access according to the present embodiment.

In another example, the base station apparatus can cause a pair of terminal apparatuses to be orthogonally multiplexed each other, and cause another pair of terminal apparatuses to be non-orthogonally multiplexed each other. In the example of FIG. 5, there are UE group 1 in which UE 1 and UE 2 are orthogonally multiplexed, and UE group 2 in which UE 3 and UE 4 are orthogonally multiplexed. The UP group 1 and the LIE group 2 are non-orthogonally multiplexed based on the reception power. In the orthogonal multiplexing, for example, a spreading code is used. In the example of FIG. 6, there are UE group 1 in which UE 1 and UE 2 are orthogonally multiplexed by using a spreading code, and UE group 2 in which UE 3 and UE 4 are orthogonally frequency multiplexed. The UE group 1 and the UE group 2 are non-orthogonally multiplexed based on the reception power, in this case, a large number of terminal apparatuses may be allocated in a case of the scheduled access. Further, in a case of the grant-free access, the terminal apparatus transmits a transmission signal based on a spreading code, an orthogonal resource such as a frequency resource, and a random selection of transmission power or an instruction from the base station apparatus. This can reduce the probability of a collision to which the base station apparatus cannot apply the interference cancellation.

Further, the terminal apparatus may transmit, to the base station apparatus, some or all of whether the function of the grant-free access is supported and whether the function of the non-orthogonal multiple access is supported, as a function in the terminal apparatus. The base station apparatus provides an instruction or configuration related to the functions supported by the terminal apparatus.

Figure 7:
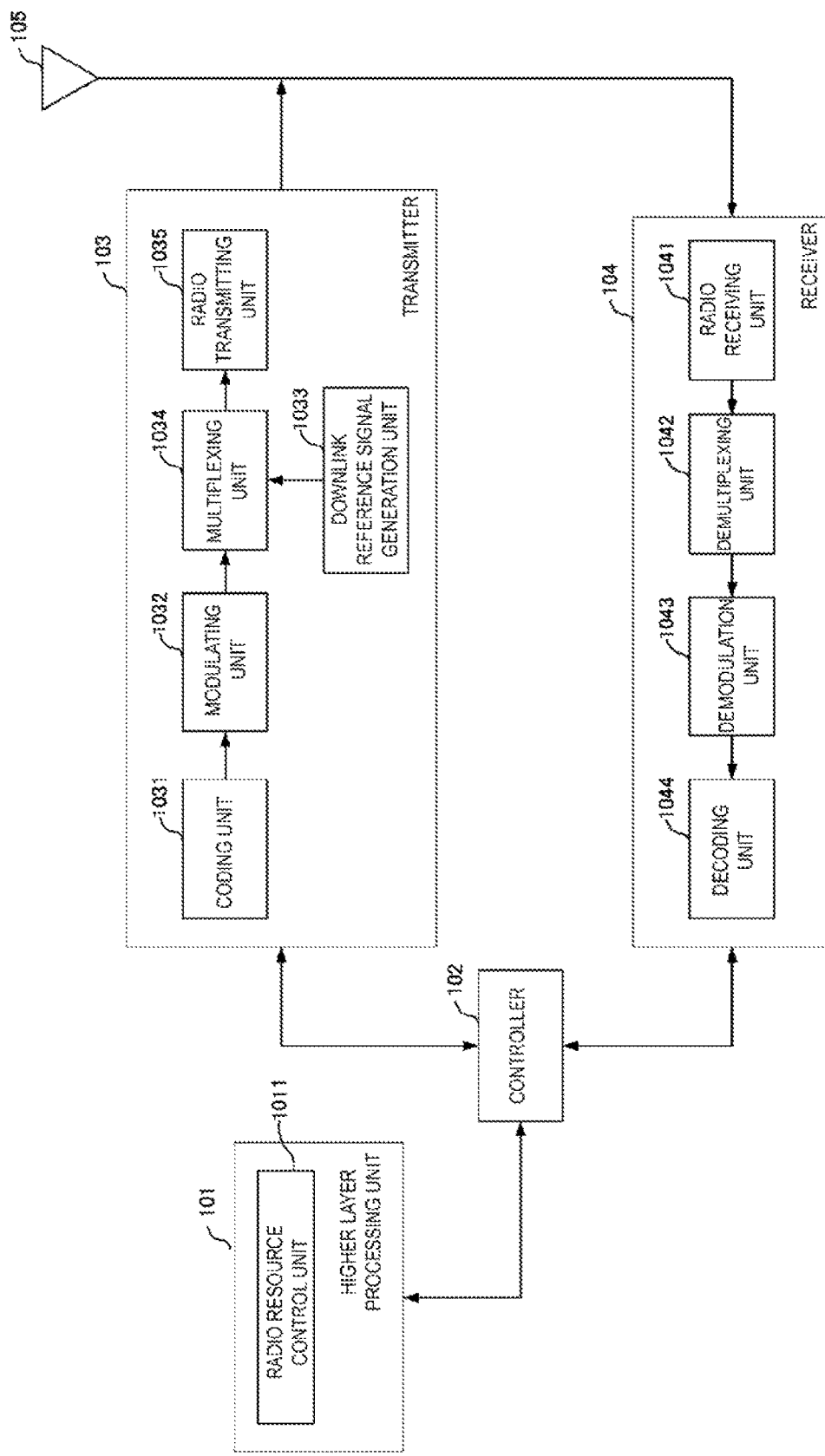
FIG. 7 is a block diagram illustrating a configuration example of a base station apparatus according to the present embodiment.

FIG. 7 is a schematic block diagram illustrating a configuration of the base station apparatus 1A according to the present embodiment. As illustrated in FIG. 7, the base station apparatus 1A is configured to include a higher layer processing unit (higher layer processing step) 101, a controller (controlling step) 102, a transmitter (transmitting step) 103, a receiver (receiving step) 104, and a transmit and/or receive antenna 105. The higher layer processing unit 101 is configured to include a radio resource control unit (radio resource controlling step) 1011. The transmitter 103 is configured to include a coding unit (coding step) 1031, a modulating unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 is configured to include a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, a Packet Data Convergence Protocol (PDCP) layer, a Radio Link Control (RLC) layer, and the Radio Resource Control (RRC) layer. Furthermore, the higher layer processing unit 101 generates information necessary for control of the transmitter 103 and the receiver 104, and performs output to the controller 102.

The higher layer processing unit 101 receives information of a terminal apparatus, such as UE capability or the like, from the terminal apparatus. To rephrase, the terminal apparatus transmits its own functions to the base station apparatus by the higher layer signaling.

Note that, the information on a terminal apparatus includes information indicating whether the terminal apparatus supports a pre-determined function, or information indicating that the terminal apparatus has completed the introduction and testing of the pre-determined function. Further, whether to support a pre-determined function includes the meaning of whether the introduction and testing of the pre-determined function have been completed.

For example, in a case that a terminal apparatus supports a pre-determined function, the terminal apparatus transmits information (a parameter) indicating whether the pre-determined function is supported. In a case that a terminal apparatus does not support a pre-determined function, the terminal apparatus does not transmit the information (a parameter) indicating whether the pre-determined function is supported. Namely, whether to support the pre-determined function is notified by means of transmitting the information (a parameter) indicating whether the pre-determined function is supported. Note that, the information (a parameter) indicating whether the pre-determined function is supported may be notified using one bit of 1 or 0.

The radio resource control unit 1011 generates, or acquires from a higher node, the downlink data (the Transport Block) allocated in the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses.

Based on the information input from the higher layer processing unit 101, the controller 102 generates a control signal for controlling the transmitter 103 and the receiver 104. The controller 102 generates the Downlink Control Information based on the information input from the higher layer processing unit 101, and performs output to the transmitter 103.

The transmitter 103 generates the downlink reference signal in accordance with the control signal input from the controller 102, encodes and modulates the HARQ indicator, the Downlink Control Information, and the downlink data that are input from the higher layer processing unit 101, multiplexes the physical channel and the downlink reference signal, and transmits the signal to the terminal apparatus 2 through the transmit and/or receive antenna 105.

The coding unit 1031 encodes the HARQ indicator, the Downlink Control Information, and the downlink data that are input from the higher layer processing unit 101, in compliance with the pre-determined coding schemes, such as block coding, convolutional coding, turbo coding, LDPC (Low Density Parity Check) coding, polar coding, or the like, or in compliance with the coding scheme determined by the radio resource control unit 1011. The modulating unit 1032 modulates the coded bits input from the coding unit 1031, in compliance with the pre-determined modulation schemes, such as Binary Phase Shift Keying (BPSK), Quadrature Phase Shift Keying (QPSK), quadrature amplitude modulation (16 QAM), 64 QAM, 256 QAM, 1024 QAM, or the modulation scheme determined by the radio resource control unit 1011.

The downlink reference signal generation unit 1033 generates, as the downlink reference signal, a sequence already known to the terminal apparatus 2A and obtainable in accordance with a pre-determined rule based on the physical cell identity (PCI, cell ID) and the like for identifying the base station apparatus 1A.

The multiplexing unit 1034 multiplexes the modulated modulation symbol of each channel, the generated downlink reference signal, and the Downlink Control Information. Namely, the multiplexing unit 1034 allocates the modulated modulation symbol of each channel, the generated downlink reference signal, and the Downlink Control Information to the resource elements.

The radio transmitting unit 1035 performs Inverse Fast Fourier Transform (IFFT) on the modulation symbol resulting from the multiplexing or the like, generates an OFDM symbol, attaches a Cyclic Prefix (CP) to the OFDM symbol to generates a baseband digital signal, converts the baseband digital signal into an analog signal, removes unnecessary frequency components through filtering, up-converts to carrier frequency, performs power amplification, and performs output to the transmit and/or receive antenna 105 for transmission.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio receiving unit 1041 converts, by down-converting the uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the orthogonally-demodulated analog signal into a digital signal.

The radio receiving unit 1041 removes a portion corresponding to the CP from the digital signal resulting from the conversion. The radio receiving unit 1041 performs Fast Fourier Transform (FFT) on the signal from which the CP has been removed, extracts a signal in the frequency domain, and performs output to the demultiplexing unit 1042.

The demultiplexing unit 1042 demultiplexes the signal input from the radio receiving unit 1041 into the signal such as the PUCCH, the PUSCH, and the uplink reference signal, Furthermore, the demultiplexing unit 1042 makes a compensation of channels on the PUCCH and the PUSCH. The demultiplexing unit 1042 demultiplexes the uplink reference signal.

The demodulation unit 1043 demodulates the received signal with respect to the PUCCH and the PUSCH, in compliance with the pre determined modulation scheme, such as BPSK, QPSK, 16 QAM, 64 QAM, 256 QAM, or the modulation scheme notified in advance by its own base station apparatus to each of the terminal apparatuses 2, by means of the uplink grant or the higher layer signaling. Further, in a case that information such as whether to use a single carrier or multi-carrier, and whether to apply DFT-spreading has been notified, the demodulation unit 1043 demodulates the received signal using the notified information.

The decoding unit 1044 decodes the coded bits of the PUCCH and the PUSCH, which have been demodulated, in compliance with the pre-determined coding scheme and at the coding rate pre-determined or pre-notified by its own base station apparatus to the terminal apparatus 2 by means of the uplink grant or the higher layer signaling, and outputs the decoded the uplink data and Uplink Control Information to the higher layer processing unit 101. In a case that PUSCH is re-transmitted, the decoding unit 1044 performs the decoding with the coded bits input from the higher layer processing unit 101 and retained in an HARQ buffer, and the demodulated coded bits.

Figure 8:
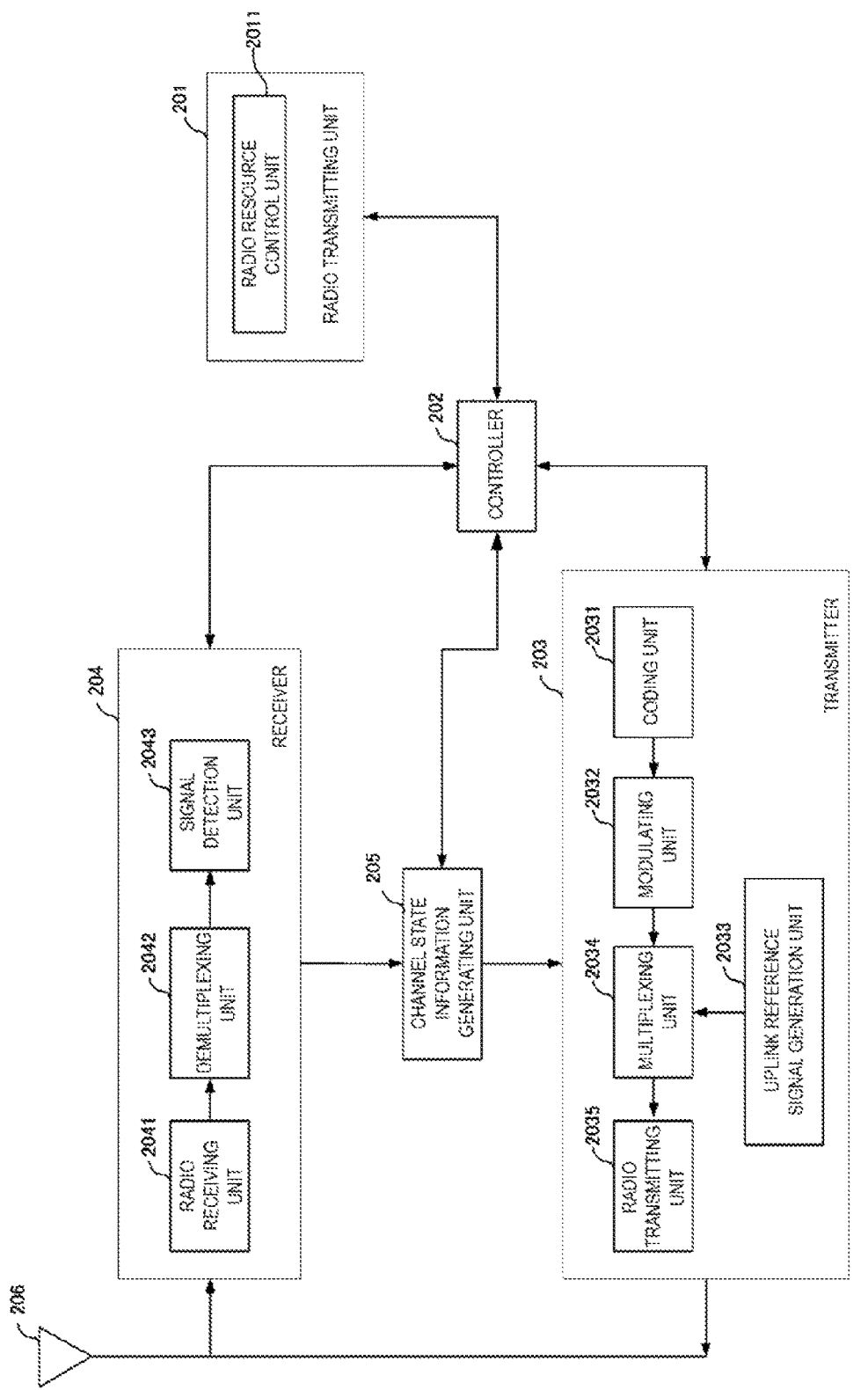
FIG. 8 is a block diagram illustrating a configuration example of a terminal apparatus according to the present embodiment.

FIG. 8 is a schematic block diagram illustrating a configuration of the terminal apparatus 2 according to the present embodiment. As illustrated in FIG. 8, the terminal apparatus 2A is configured to include a higher layer processing unit (higher layer processing step) 201, a controller (controlling step) 202, a transmitter (transmitting step) 203, a receiver (receiving step) 204, a Channel State information generating unit (Channel State information generating step) 205, and a transmit and/or receive antenna 206. Further, the higher layer processing unit 201 is configured to include a radio resource control unit (radio resource controlling step) 2011. In addition, the transmitter 203 is configured to include a coding unit (coding step) 2031, a modulating unit (modulating step) 2032, an uplink reference signal generation unit (uplink reference signal generating step) 2033, a multiplexing unit (multiplexing step) 2034, and a radio transmitting unit (radio transmitting step) 2035. Further, the receiver 204 is configured to include a radio receiving unit (radio receiving step) 2041, a demultiplexing unit (demultiplexing step) 2042, and a signal detection unit (signal detecting step) 2043.

The higher layer processing unit 201 outputs the uplink data (the Transport Block) generated by a user operation or the like, to the transmitter 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information indicating functions of a terminal apparatus supported by its own terminal apparatus.

Furthermore, the radio resource control unit 2011 manages various configuration information of its own terminal apparatus. Furthermore, the radio resource control unit 2011 generates information to be allocated to each uplink channel, and performs output to the transmitter 203.

The radio resource control unit 2011 acquires configuration information of CSI feedback transmitted from the base station apparatus, and performs output to the controller 202.

Based on the information input from the higher layer processing unit 201, the controller 202 generates a control signal for controlling the receiver 204, the Channel State Information generating unit 205, and the transmitter 203. The controller 202 outputs the generated control signal to the receiver 204, the Channel State Information generating unit 205 and the transmitter 203, to control the receiver 204 and the transmitter 203.

The controller 202 controls the transmitter 203 such that the CSI generated by the Channel State Information generating unit 205 is transmitted to the base station apparatus.

In accordance with the control signal input from the controller 202, the receiver 204 demultiplexes, demodulates, and decodes a reception signal received from the base station apparatus 1A through the transmit and/or receive antenna 206, and outputs the resulting information to the higher layer processing unit 201.

The radio receiving unit 2041 converts, by down-converting, the downlink signal received through the transmit and/or receive antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

In addition, the radio receiving unit 2041 removes a portion corresponding to the CP from the digital signal resulting from the conversion, performs fast Fourier transform on the signal from which the CP has been removed, and extracts a signal in the frequency domain.

The demultiplexing unit 2042 demultiplexes the extracted signal into the physical channel and the downlink reference signal, respectively. Further, the demultiplexing unit 2042 makes a compensation of the physical channel based on a channel estimation value of the desired signal obtained from the channel measurement, detects the Downlink Control Information, and performs output to the controller 202.

Additionally, the controller 202 outputs the PDSCH and the channel estimation value of the desired signal to the signal detection unit 2043.

The signal detection unit 2043, using the PDSCH and the channel estimation value, detects a signal, and performs output to the higher layer processing unit 201.

The transmitter 203 generates the uplink reference signal in accordance with the control signal input from the controller 202, encodes and modulates the uplink data (the Transport Block) input from the higher layer processing unit 201, multiplexes the PUCCH, the PUSCH, and the generated uplink reference signal, and perform transmission to the base station apparatus 1A through the transmit and/or receive antenna 206.

The coding unit 2031 encodes the Uplink Control Information and the PUSCH input from the higher layer processing unit 201 in compliance with a coding, scheme, such as convolutional coding, block coding, turbo coding, LPDC coding, polar coding, or the like.

The modulating unit 2032 modulates coded bits input from the coding unit 2031, in compliance with the modulation scheme notified by means of the Downlink Control Information, such as BPSK, QPSK, 16 QAM, or 64 QAM, or in compliance with a modulation scheme pre-determined for each channel.

The uplink reference signal generation unit 2033 generates a sequence obtainable according to a pre-determined rule (formula), based on a physical cell identity (PCI, also referred to as a cell ID or the like) for identifying the base station apparatus 1A, a bandwidth to which the uplink reference signal is mapped, a cyclic shift notified by means of the uplink grant, a parameter value for generation of a DMRS sequence, and the like.

The multiplexing unit 2034 multiplexes signals of the PUCCH and the PUSCH and the generated uplink reference signal for each transmit antenna port. Namely, the multiplexing unit 2034 maps signals of the PUCCH and the PUSCH and the generated uplink reference signal in the resource elements for each transmit antenna port.

The radio transmitting unit 2035 generates a baseband digital signal from the multiplexed signal, converts the baseband digital signal into an analog signal, removes unnecessary frequency components, up-converts to carrier frequency, performs power amplification, and performs output to the transmit and/or receive antenna 206 for transmission.

A program running on an apparatus according to the present invention may be a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being, processed, or stored in a non-volatile memory such as a flash memory, or a Hard Disk Drive (HDD), and then read by the CPU to be modified or rewritten, as necessary.

Note that the apparatuses in the above-described embodiment may be partially enabled by a computer. In that case a program for realizing the functions of the embodiments may be recorded on a computer readable recording medium. This may be realized by causing a computer system to read the program recorded on this recording medium for execution. It is assumed that the "computer system" mentioned here refers to a computer system built into the apparatus, and the computer system includes an OS and hardware components such as a peripheral apparatus. Furthermore, the "computer-readable recording medium" may be any of a semiconductor recording medium, an optical recording medium, a magnetic, recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application. Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a conventional-type processor, a controller, a micro-controller, or a state machine. The above-described electric circuit may be constituted by a digital circuit or an analog circuit. Furthermore, in a case that a circuit integration technology that replaces the present integrated circuits appears with advances in semiconductor technology, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatus.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and the embodiments that are made by suitably combining technical means disclosed according to the different embodiments are also included in the technical scope of the present invention. Furthermore, a configuration in which constituent elements, described in the respective embodiments and having the similar effects, are substituted for one another is also included.

INDUSTRIAL APPLICABILITY

The present invention can be preferably used in a base station apparatus, a terminal apparatus, and a communication method.

The present international application claims priority based on JP 2016-096130 filed on May 12, 2016, and all the contents of JP 2016-096130 are incorporated in the present international application by reference.

REFERENCE SIGNS LIST

1A Base station apparatus
2A, 2B Terminal apparatus
101 Higher layer processing unit
102 Controller
103 Transmitter
104 Receiver
105 Transmit and/or receive antenna
1011 Radio resource control unit
1031 Coding unit
1032 Modulating unit
1033 Downlink reference signal generation unit
1034 Multiplexing unit
1035 Radio transmitting unit
1041 Radio receiving, unit
1042 Demultiplexing unit
1043 Demodulation unit
1044 Decoding unit
201 Higher layer processing unit
202 Controller
203 Transmitter
204 Receiver
205 Channel state informal on generating unit
206 Transmit and/or receive antenna
2011 Radio resource control unit
2031 Coding unit
2032 Modulating unit
2033 Uplink reference signal generation unit
2034 Multiplexing unit
2035 Radio transmitting unit
2041 Radio receiving unit
2042 Demultiplexing unit
2043 Signal detection unit

The invention claimed is:
1. A terminal apparatus for communicating with a base station apparatus, the terminal apparatus comprising:
a receiver configured to receive first radio resource control (RRC) information for indicating a first resource, second RRC information for indicating a second resource, first transmission power control information and second transmission power control information that are for transmitting an uplink shared channel; and
a transmitter configured to transmit a transmission signal to the base station apparatus by using the first resource or the second resource, wherein
the first resource is one part of frequency resources in a first serving cell,
the second resource is another part of the frequency resources in a second serving cell,
the first RRC information and the second RRC information are configured in advance by the base station apparatus,
in a case of communicating by using the first resource, a transmission power control is performed based on the first transmission power control information to transmit the transmission signal,
in a case of communicating by using the second resource, the transmission power control is performed based on the second transmission power control information to transmit the transmission signal, and the terminal apparatus is configured to communicate with the base station apparatus by using a plurality of serving cells in a carrier aggregation, the plurality of serving cells include a primary cell and at least a secondary cell, and the first serving cell is the primary cell and the second serving cell is the secondary cell.

2. The terminal apparatus according to claim 1, wherein the first transmission power control information includes
a transmission power value or a transmission power control parameter, and in a case that the transmission power value is included, a transmission is performed at the transmission power, and in a case that the transmission power control parameter is included, the transmission is performed at a transmission power calculated based on the transmission power control parameter.

3. The terminal apparatus according to claim 1, wherein in a case of communicating by using the second resource,
a transmission is performed at a transmission power obtained by adding a random power offset to a power calculated based on a transmission control parameter included in the second transmission power control information.

4. The terminal apparatus according to claim 1, wherein in a case of communicating by using the second resource,
a power headroom is calculated that is a difference between a maximum transmission power and a transmission power calculated based on a transmission power control parameter included in the second transmission power control information, and in a case that the power headroom has a negative value, the terminal apparatus requests a scheduled access to the base station apparatus.

5. A base station apparatus for communicating with a terminal apparatus, the base station apparatus comprising:
a transmitter configured to transmit first radio resource control (RRC) information for indicating a first resource, second RRC information for indicating a second resource, first transmission power control information and second transmission power control information that are for transmitting an uplink shared channel; and a receiver configured to receive a signal from the terminal apparatus by using the first resource or the second resource, wherein the first resource is one part of frequency resources in a first serving cell, the second resource is another part of the frequency resources in a second serving cell, the first RRC information and the second RRC information are configured in advance, by using the first resource, the signal subjected to a transmission power control based on the first transmission power control information is received, by using the second resource, the signal subjected to the transmission power control based on the second transmission power control information is received, and the base station apparatus is configured to communicate with the terminal apparatus by using a plurality of serving cells in a carrier aggregation, the plurality of serving cells include a primary cell and at least a secondary cell, and the first serving cell is the primary cell and the second serving cell is the secondary cell.

6. The base station apparatus according to claim 5, wherein
the first transmission power control information includes a transmission power value or a transmission power control parameter, and in a case that the transmission power value is included, the signal transmitted at the transmission power is received, and in a case that the transmission power control parameter is included, the signal transmitted at a transmission power calculated based on the transmission power control parameter is received.

7. The base station apparatus according to claim 5, wherein,
by using the second resource, the base station apparatus receives the signal transmitted at a transmission power obtained by adding a random power offset to a power calculated based on a transmission control parameter included in the second transmission power control information.

8. A communication method of a terminal apparatus for communicating with a base station apparatus, the method comprising steps of:
receiving first radio resource control (RRC) information for indicating a first resource, second RRC information for indicating a second resource, first transmission power control information and second transmission power control information that are for transmitting an uplink shared channel; and transmitting a transmission signal to the base station apparatus by using the first resource or the second resource, wherein the first resource is one part of frequency resources in a first serving cell, the second resource is another part of the frequency resources in a second serving cell, the first RRC information and the second RRC information are configured in advance by the base station apparatus, in a case of communicating by using the first resource, a transmission power control is performed based on the first transmission power control information to transmit the transmission signal, and in a case of communicating by using the second resource, the transmission power control is performed based on the second transmission power control information to transmit the transmission signal and the terminal apparatus is configured to communicate with the base station apparatus by using a plurality of serving cells in a carrier aggregation, the plurality of serving cells include a primary cell and at least a secondary cell, and the first serving cell is the primary cell and the second serving cell is the secondary cell.

9. A communication method of a base station apparatus for communicating with a terminal apparatus, the method comprising steps of:
transmitting first radio resource control (RRC) information for indicating a first resource, second RRC information for indicating a second resource, first transmission power control information and second transmission power control information that are for transmitting for transmitting an uplink shared channel; and receiving a signal from the terminal apparatus by using the first resource or the second resource, wherein the first resource is one part of frequency resources in a first serving cell, the second resource is another part of the frequency resources in a second serving cell, the first RRC information and the second RRC information are configured in advance,
by using the first resource, the signal subjected to a transmission power control based on the first transmission power control information is received,
by using the second resource, the signal subjected to the transmission power control based on the second transmission power control information is received, and
the base station apparatus is configured to communicate with the terminal apparatus by using a plurality of serving cells in a carrier aggregation,
the plurality of serving cells include a primary cell and at least a secondary cell, and
the first serving cell is the primary cell and the second serving cell is the secondary cell.

* * * * *